UNITED STATES PATENT OFFICE.

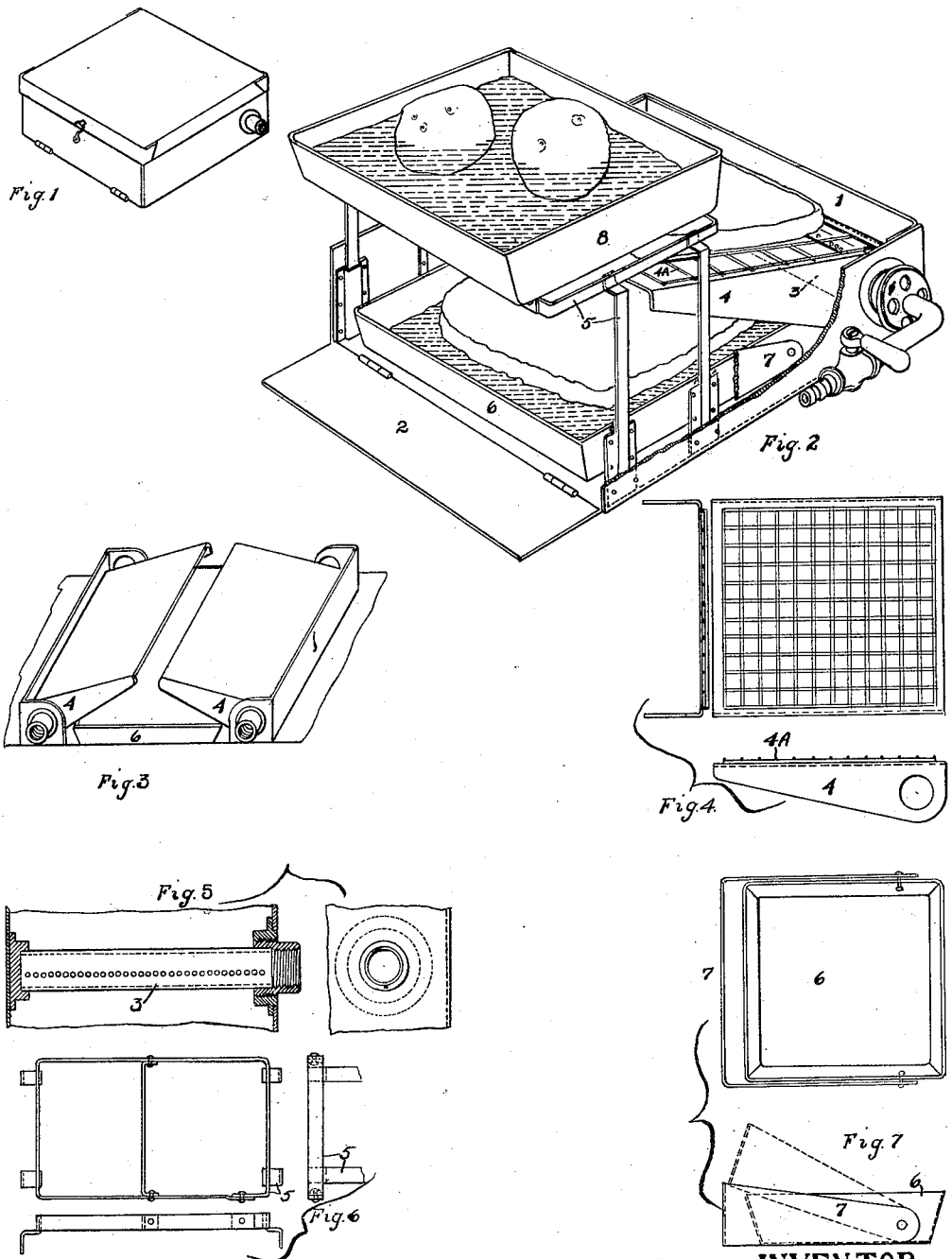

JOHN THOMAS ONIONS, OF ALBANY, NEW YORK.

COMBINATION COOKING APPARATUS.

1,102,540. Specification of Letters Patent. Patented July 7, 1914.

Application filed November 11, 1913. Serial No. 800,417.

*To all whom it may concern:*

Be it known that I, JOHN THOMAS ONIONS, citizen of Great Britain, and resident of Albany, in the county of Albany and State of New York, have invented a certain new and useful Combination Cooking Apparatus, of which the following is a specification.

My invention relates to cooking apparatus and the objects of my invention are to provide an apparatus which may be used with gas, oil or like substance in which the same flame will roast or broil meat and boil coffee or vegetables and toast bread and in which the heat from the flame may be utilized to a greatest extent. I accomplish these objects by means of the apparatus described in the accompanying drawings, in which—

Figure 1 is a perspective view of a box containing my cooking apparatus packed in a portable form so that it can be readily transported. Fig. 2 is a perspective view of my cooking apparatus spread out in position, ready for use. Fig. 3 is a modification of the heat conductor made with double burners. Fig. 4 is an end elevation of the heat conductor the upper portion of this figure showing a plan thereof. Fig. 5 is a longitudinal section of gas burner used in my cooking apparatus the right hand end being shown separately in elevation. Fig. 6 shows details of the rack and standards to support cooking utensils above the flame same being shown in plan, end and side elevations. Fig. 7 is a detail of the pan for cooking meat shown in side elevation and plan.

Similar numerals refer to similar parts throughout the several views.

Referring to the drawings, 1 represents the box in which my cooking apparatus is contained.

2 is the front side of the box which is hinged to the bottom and may be let down in a horizontal position as shown in Fig. 2. Inside of the box are contained standards 5 which may be inserted in suitable brackets to sustain the rack used for supporting the cooking utensils 8 as shown in Fig. 2. At the back of the cooking apparatus is the gas pipe 3. The heat may be supplied by suitable gasolene or kerosene tank or may be supplied by gas pipe, as shown in Fig. 3. I do not confine this invention to the gas pipe but show the gas pipe as more convenient and as an illustration of the other means.

4 is a heat conductor which is located at the back of the box containing the cooking apparatus and is so arranged above the flame that the flame will be spread out along the bottom of the top of the conductor 4. I provide openings near the ends of the sides of the conductor through which the gas pipe passes as shown in Figs. 2, 3 and 4, and the heat conductor is thus permitted to partially revolve around the gas pipe and is arranged so as to be at any desired angle with the gas pipe 3. It is evident that when the conductor 4 is in a nearly horizontal position that the heat of the flame will descend more directly and the heat will be greater in the pan 6 than when the conductor is supported at a greater angle.

The standard 5 is attached to the side of the cooking apparatus in any suitable manner so that the heat escaping from the front edge of the conductor 4 will heat the cooking utensils supported on the rack 5. There will also be a clear space over the top of the conductor 4. Within this space upon the top of the heat conductor may be laid a wire netting of any kind upon which may be spread out the bread desired to be toasted. Under the heat conductor 4 is located the roasting pan 6 in which may be inserted the meat or food desired to be roasted or broiled by the flame. It is thus evident that the same flame will toast the bread lying upon the wire netting on top of the conductor 4 and cook vegetables or coffee over the flame and other food in the pan under the flame, all at the same time.

When desired the cooking apparatus may have a double burner as shown in Fig. 3. As thus constructed the cooking apparatus would do double the amount of work and the apparatus would still be compact and arranged upon substantially the same principle as the single heater and without departing from the spirit of the invention. The conductor 4 can be held at any desired angle by any suitable means. The pan 6 may have a shield attached to the pan as shown in Fig. 7 which may be pivoted or hinged to the pan so as to shut off the front and sides and confine the heat more directly to the meat being cooked than by leaving an open space to the front of the pan. Constructed in this way my cooking apparatus may be packed in a small space and easily portable and the single burner perform several operations and cook several kinds of food at the same time and the whole apparatus be simple in construction, economical in use and easily transported from place to place, as may be desired.

What I claim as my invention and desire to secure by Letters Patent is,

1. In combination a heat generator, a heat conductor located above the heat generator at an angle to the plane of the generator and pivotally attached thereto means for supporting cooking utensils above the heat conductor and means for roasting or broiling meats below the flame under the conductor, substantially as described.

2. In a cooking apparatus a heat generator, a heat conductor attached to said heat generator above the flame thereof and at an angle to the plane of the heat generator, standards adapted to support cooking utensils above the heat conductor, a pan adapted to contain meat below said heat conductor and means for toasting bread above the heat conductor.

3. In a cooking apparatus a container having a cover adapted to be removed, the front side of said container hinged to the bottom thereof, a heat conductor pivoted to the back of said container, means for conducting and burning gas or oil under said conductor, means for supporting said heat conductor at an angle to the bottom of said conductor, means for supporting cooking utensils above said conductor and above the flame under said conductor, a pan adapted to be located under the flame under said conductor and means for closing the opening around said pan under said heat conductor, substantially as described for the purposes set forth.

Signed at Albany, in the county of Albany and State of New York this tenth day of November A. D. 1913.

JOHN THOMAS ONIONS.

Witnesses:
 PETER A. HART,
 DANIEL S. FLINN.

---

Copies of this patent may be obtained for five cents each, by addressing the "Commissioner of Patents, Washington, D. C."